United States Patent [19]
Neal et al.

[11] 3,796,030
[45] Mar. 12, 1974

[54] BAT AND TINE CONSTRUCTION FOR A HARVESTER REEL

[75] Inventors: Archie E. Neal; Donald R. Gradwohl, both of Garfield, Wash.

[73] Assignee: J. E. Love Company, Garfield, Wash.

[22] Filed: Oct. 16, 1972

[21] Appl. No.: 297,882

[52] U.S. Cl. .................................. 56/220, 56/400
[51] Int. Cl. ............................................ A01d 57/02
[58] Field of Search ........................... 56/219–221, 56/400, 227

[56] References Cited
UNITED STATES PATENTS

| | | | |
|---|---|---|---|
| 3,561,198 | 2/1971 | Herbsthofer | 56/221 X |
| 3,232,035 | 2/1966 | Vissers | 56/219 X |
| 2,909,889 | 10/1959 | Gustafson | 56/400 |
| 3,613,346 | 10/1971 | Hubbard | 56/400 |
| 3,626,678 | 12/1971 | Quam | 56/400 |

Primary Examiner—Louis G. Mancene
Assistant Examiner—J. N. Eskovitz
Attorney, Agent, or Firm—Delbert J. Barnard

[57] ABSTRACT

A plurality of tubular bat blade sections are interconnected by journal sections having end portions which extend into the end portions of the bat sections. Crank sections at the two ends of the bat include end portions which extend into the outer ends of the two outer bat blade sections. The bat blade sections are tapered from top to bottom. Lower portions of the bat blade sections are received in mounting channels provided at upper ends of molded plastic tines. These tines may carry buttons which snap into mounting openings formed in side wall portions of the bat sections.

6 Claims, 14 Drawing Figures

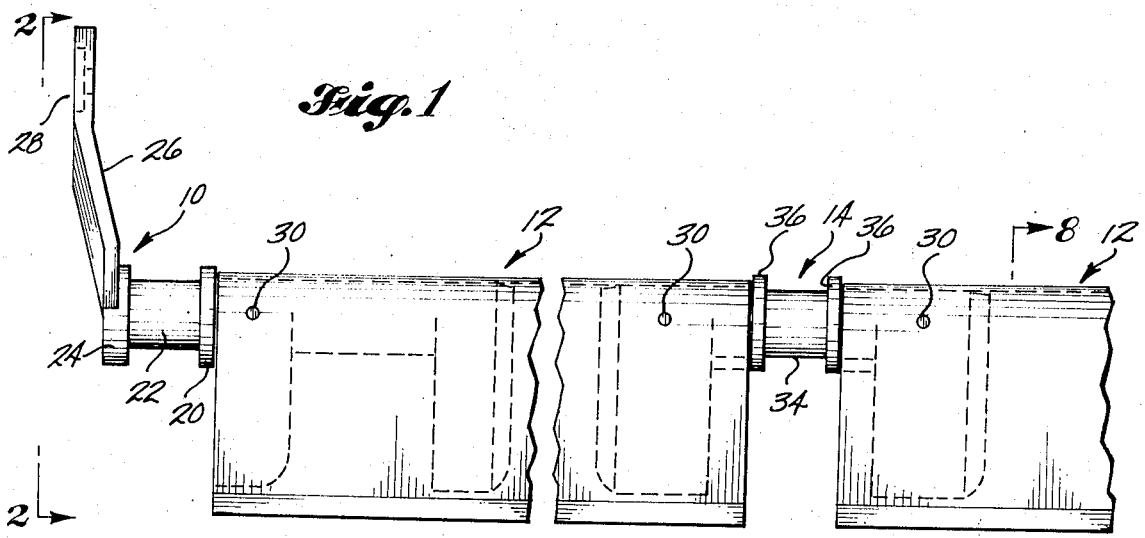
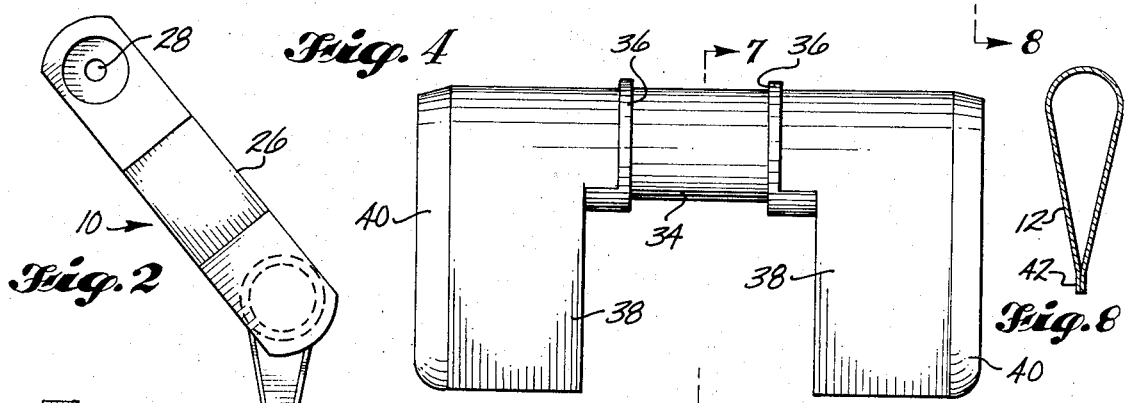
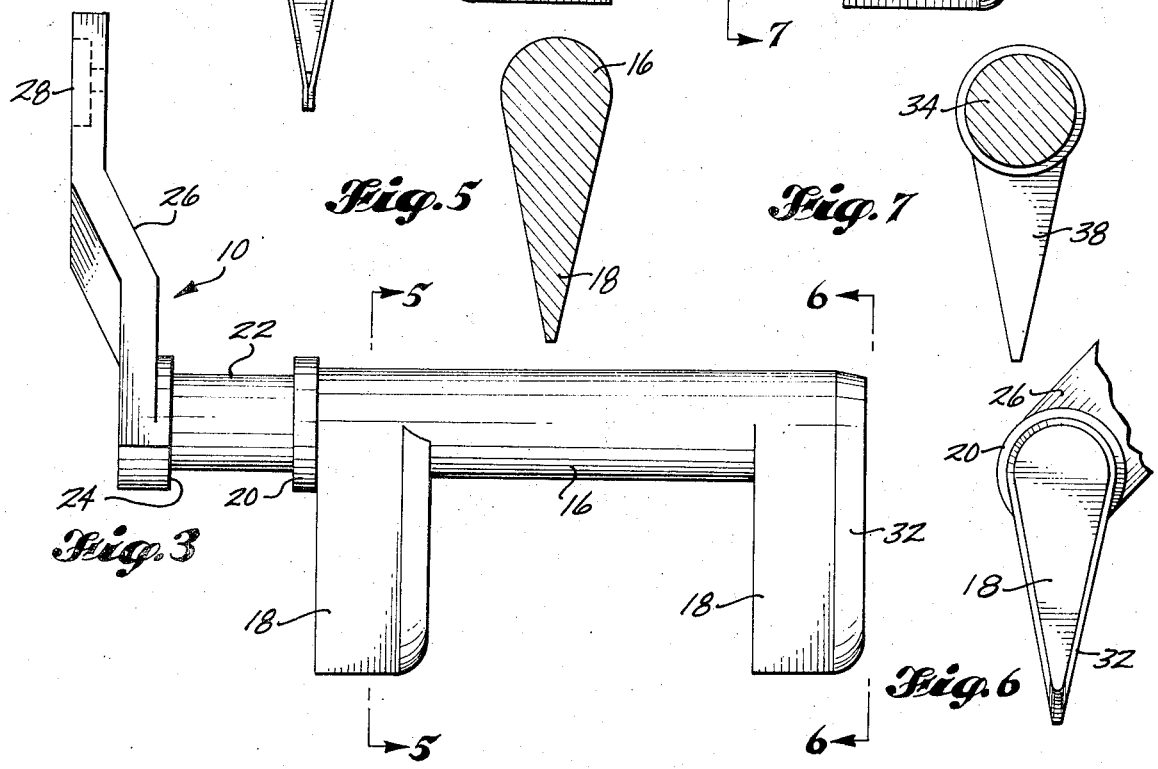

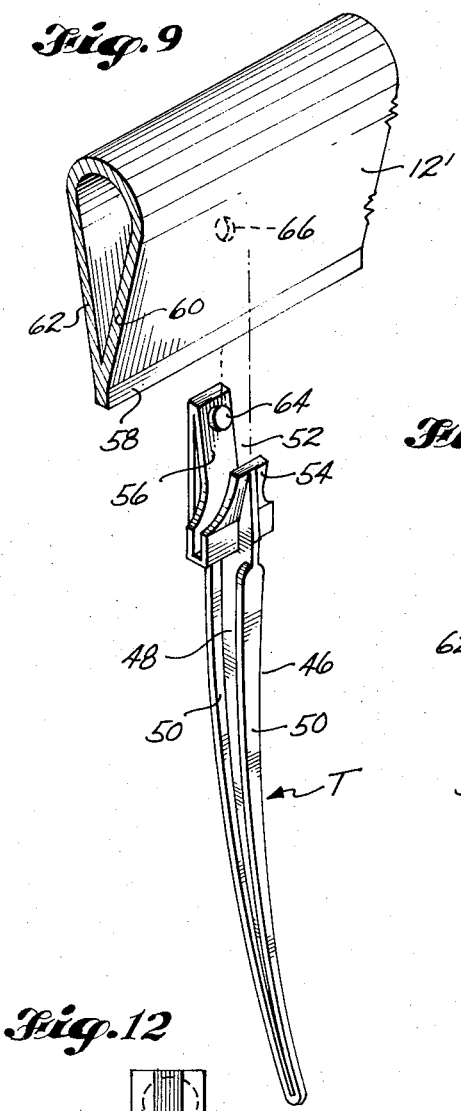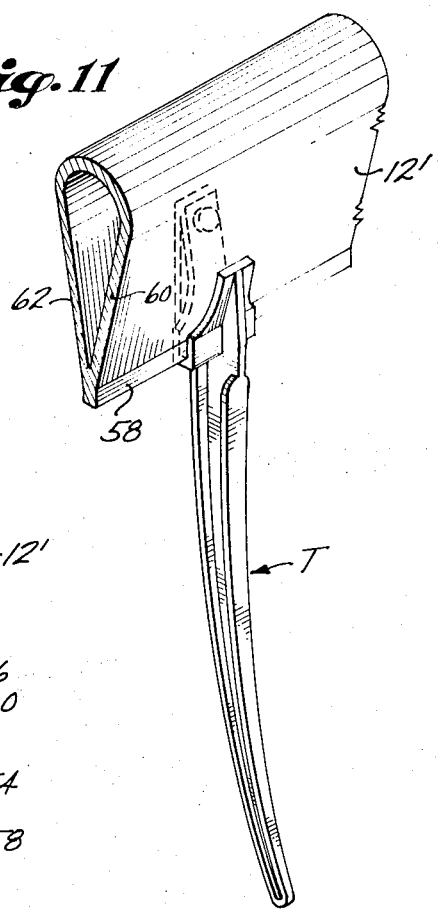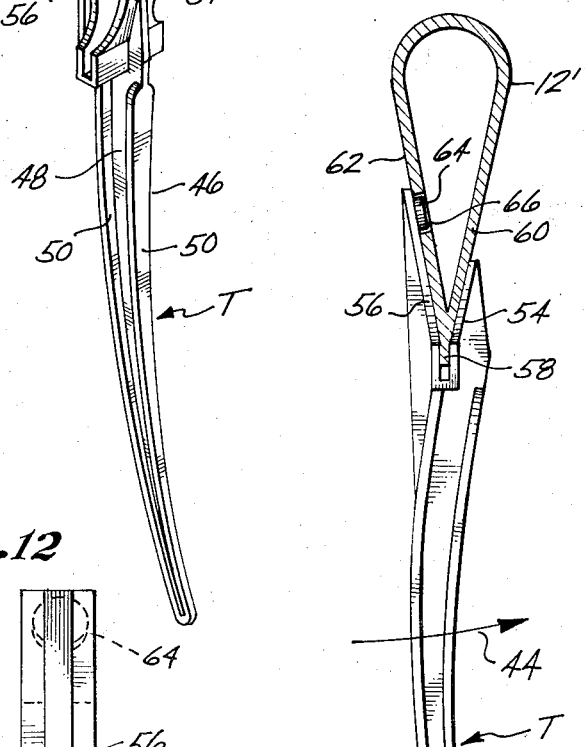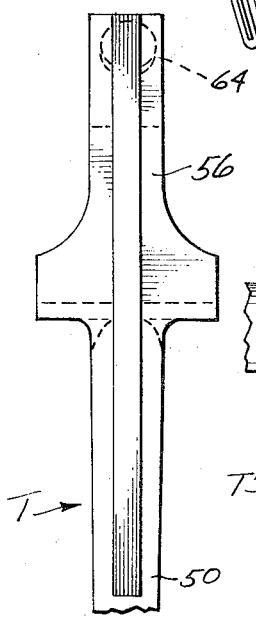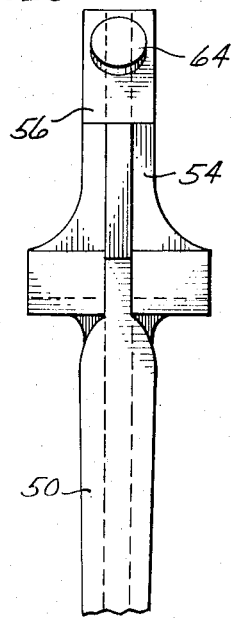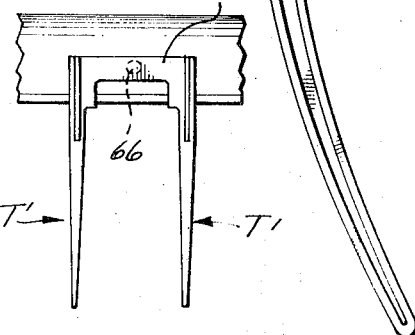

3,796,030

BAT AND TINE CONSTRUCTION FOR A HARVESTER REEL

BACKGROUND OF THE INVENTION

1. Field of the Invention

The present invention relates to improvements in harvester pick-up reels, and in particular to an improved bat construction, and to an improved pick-up tine construction.

2. Description of the Prior Art

Known harvester reel bats and pick-up tines are shown by U.S. Pat. Nos. 2,497,729; 3,145,520 and 3,613,346. The most widely used conventional bats comprise an elongated rod which extends the entire length of the harvester reel and a plurality of bat boards of rectangular configuration which are secured to the rod and depend therefrom. The rod is supported for rotation at its ends and at the locations between the bat boards. The bats are driven by an essentric drive mechanism which operates to maintain the boards in a substantially vertically attitude during reel rotation. Examples of these essentric mechanisms are disclosed by the aforementioned U.S. Pat. Nos. 2,497,729 and 3,145,520, and also by U.S. application Ser. No. 077,132, filed on Oct. 1, 1970, by the Assignee of the present application, the inventors being Donald R. Gradwohl and Archie E. Neal.

The most widely used conventional pick-up tines are formed from wire and they are carried by the bat boards. The aforementioned U.S. Pat. No. 3,613,346 discloses the use of molded plastic tines which are carried by elongated bat rods.

SUMMARY OF THE INVENTION

The harvester reel bats of this invention are of composite construction. They comprise a plurality of cast and tubular sections connected together end-to-end. The cast sections comprise a pair of crank sections which are at the two ends of the bat and which carry the outer journals of the bat. The remaining cast sections are intermediate journal sections serving also as connector members for interconnecting the tubular bat blade sections. An advantage of this construction is that the cast sections are usable with any length of reel. Length variances between bats of different length reels can be neatly provided by varying only the lengths (and possibly the number) of the several bat blade sections.

According to the invention, the bat blade sections taper from their upper to their lower edges. This provides the bat sections with thin lower edges which enter better into the crop being harvested, and cause less damage to the crop, than conventional bat boards having wide, blunt lower edges.

According to the invention, the tines are constructed from a suitable structural plastic, e.g. nylon. They include upper mounting portions which snap into place at stations along the lower edge of the bat sections. Preferably, such tines include mounting channesl which snugly engage lower portions of the bat blade sections and a suitable fastener for securing the tines to the bat blade sections.

These and other more specific details of the composite harvester reel bat and pick-up tines of this invention are presented below in the detailed Description of the Preferred Embodiment.

BRIEF DESCRIPTION OF THE DRAWING

FIG. 1 is a fragmentary elevational view looking towards one side of an end portion of the harvester reel bat of the present invention;

FIG. 2 is an end elevational view of the crank section at such one end of the harvester reel bat;

FIG. 3 is an elevational view of the crank section taken from the same aspect as FIG. 1;

FIG. 4 is a view similar to FIG. 3, but of a journal section of the bat;

FIG. 5 is a sectional view taken substantially along line 5—5 of FIG. 3;

FIG. 6 is an inner end elevational view of the crank section of the bat, taken from the aspect of line 6—6 in FIG. 3;

FIG. 7 is a sectional view taken substantially along line 7—7 of FIG. 4;

FIG. 8 is a sectional view taken along line 8—8 of FIG. 1;

FIG. 9 is a fragmentary sectional view of a modified bat blade section with a tine shown in spaced relationship thereto;

FIG. 10 is a cross-sectional view taken through the bat blade section of FIG. 9 showing the tine in side elevation;

FIG. 11 is a view like FIG. 9, but showing the tine connected to the bat blade section;

FIG. 12 is a fragmentary elevational view looking towards the trailing side of the tine;

FIG. 13 is a view like FIG. 12 but looking towards the leading side of the tine; and FIG. 14 is a reduced scale elevational scale of a two-tine member attached to a bat blade section.

DESCRIPTION OF THE PREFERRED EMBODIMENT

The composite harvester reel bat of the present invention comprises a pair of crank end sections, one of which is shown and is designated 10 (FIGS. 1 and 2), a plurality of blade sections 12, and a plurality of journal sections 14 which are between and interconnect the blade sections 12. The second crank section (not shown) at the opposite end of the bat is like section 10 but oppositely directed. The number of blade and journal sections 12, 14 is variable and is dependent upon the length and style of the harvester reel.

As shown by FIGS. 1 and 3, the crank section 10 comprises a pin portion 16 composed of a cylindrical body from which a pair of tapered end pieces 18 depend. The pin 16 is sized to be snuggly received within the hollow interior of the bat blade section 12. A flange 20 limits the entry of the members 16, 18 into the bat blade section 12 and also provides one end boundary for a journal 22. The other end boundary of the journal 22 is provided by the base portion 24 of a crank arm 26. The end of crank arm 26 opposite portion 24 is provided with a through opening 28 for receiving a connector used to connect such end of the crank arm 26 to a portion of an eccentric drive mechanism (not shown). Reference is made to the aforementioned application Ser. No. 77,132 for a disclosure of a typical eccentric drive. When the bat is installed onto a harvester reel the journal 22 is received within a suitable journal box forming member which is carried by the reel.

As shown by FIG. 3, the leading end portion 32 of the inner member 18 may be beveled so that it can be easily started into the bat blade section 12. Preferably, the members 16, 18 are sized so that they make a rather tight frictional fit with the interior wall of the bat blade section 12.

Referring now to FIG. 4 and 7, the journal sections 14 comprise a central journal 34 bounded at each end by a flange 36. A pin portion 38 is disposed endwise outwardly of each flange 36. Each pin portion 38 is sized to be snuggly received within an end portion of a bat blade section 12. Preferably the fit is tight enough so that the pin section 38 makes a snug frictional engagement with the inner wall of the bat blade section 12. Pin sections 38 also include beveled end portions for starting them into sections 12.

The members 16, 18, 38 are retained within the bat blade section 12 by suitable connectors. By way of typical and therefor non-limitive example, this securement may be done by means of one or more cross pins 30 which extend through both the blade section 12 and members 16, 18 or 38.

When the bat is on a harvester reel suitable journal boxes carried by the reels surroundingly engage the journal 34. Preferably, the crank and journal sections 10, 14 are made by casting them from a suitable metal. The blade sections 12 may be formed from bent sheet metal which is seam welded along the lower edges 42 of the sections 12, where the two parts of the sheet metal panels forming the sections 12 come together (FIG. 8). Alternatively, the hollow bat blades section 12 may be formed by an extrusion process (FIGS. 9–11).

During use the pick-up reel rotates forwardly at its top and rearwardly at its bottom. Each bat carries a plurality of tines T which enter into the fallen crop and effect "comb" the crop upwardly and rearwardly into a cutter mechanism which severs the crop near the ground. The tines and bats then sweep the severed crop rearwardly into a collection portion of the harvester. The direction of tine movement is indicated by the arrow 44 in FIG. 10. An advantageous feature of the bat construction of this invention is that the bat has a thin lower edge which enter into the crop better than a relatively thick blunt edge. As a result, each bat makes less lay-over contact with the crop than conventional bats resulting in less crop loss.

Preferably, the tines T are molded from a suitable structural plastic, e.g. nylon. The tine body 46 may comprise a thin web portion 48 and front and rear flange portions 50, giving the tine body 46 an I-beam cross-sectional shape. The upper end of each tine may comprise a mounting channel 52 defined by front and rear walls 54, 56. As best shown by FIG. 10, the mounting channel 52 is sized to snuggly receive a lower portion of the bat blade section 12'. It may be said that the mounting channel and the bat section 12' have complementary cross-sectional configurations. The lower portions of walls 54, 56 are parallel to each other and receive the lower lip portion 58 of the bat section 12' which has parallel sides. The upper portions of walls 54, 56 flare apart to receive the upwardly diverging walls 60, 62 of the bat section 12'.

In the embodiment shown by FIGS. 9–13, the mounting channel 52 is elongated laterally of the tine web 58. The walls 54, 56 defining the channels 52 extend laterally from the web 48 on both sides of such web 48 (see FIGS. 12 & 13). This makes it possible to secure the tine T to the bat section 12' by the means of but a single point fastener such as a button 64 insertable into a button opening 66 formed in a side wall 62 of bat section 12'. The button and holes 64, 68 physically connect the tine T to the bat section 12'. The snug fit of the lower portion of the bat section 12' into the mounting channel 52 prevents rotation of the tine T in the front and rear directions. The elongation of the mounting channel 52 longitudinally of the bat blade section 12 prevents sideways rotation of the tine T. The button 64 is provided on the rear wall 56 so that during tine movement it is forced into the opening 66. As the tine T is moved through the crop in the direction of arrow 44 the forces exerted on the lower portion of the tine T by the crop tend to rotate the tines T rearwardly. This in turn causes a forward rotational tendency of the wall 56, resulting in the button 64 tending to be moved into rather than out from the opening 66.

According to the invention, a plurality of tines may be connected together and be on a common base. By way of typical and therefor non-limitive example, in FIG. 14 a pair of tines T' are shown connected to a common mounting base 68. The base 68 comprises front and rear mounting channel forming walls which are similar to walls 54, 56 in the embodiment of FIGS. 9–13. In the embodiment of FIG. 14 the wide spacing of the mounting channels of the tines T' provides bracing against sideways rotation of the tines T, again making it possible to use a single fastener, such as a single button 66.

Of course, it is to be understood that other forms of fasteners may be used in place of the button and hole arrangement 64, 66 that is illustrated. For example, a more positive fastener like a nut-and-bolt assembly might be used.

The construction of the bat sections 12', and the mounting structure for the preferred embodiments of the tines T, T', make installation of the tines T, T' onto the bat sections 12' both fast and easy. A tine T or T' need only be moved towards the lower edge portion 58 of the bat section 12 or 12', with the button 64 being directed towards the mounting hole 66 for such tine and the lower edge 58 being moved relatively into the channel section 52. During such relative movement the button 64 will slide along wall 62 until it reaches the opening 66 and then it will snap into the opening 66.

In one foregoing specification the illustrated embodiments, the invention has been described for the purpose of making a complete disclosure of the invention. As will be apparent to those skilled in the art, numerous constructional changes may be made in the bats and tines without departing from the spirit and principles of the invention. The scope of the invention is not to be determined by such detailed description but rather only by the claims which follow.

What is claimed is:

1. A harvester reel bat comprising: a plurality of tubular bat blade sections interconnected by journal sections having end portions which project into the opposite ends of the tubular sections, and crank sections at each end of said bat having inner end portions which extend into outer end portions of the outer bat blade sections, said crank and journal sections having journals thereon, and said crank sections having crank arm portions situated endwise outwardly of their journal portions, each said journal section comprising a central journal portion, flanges at the ends of the journal portion, and pin portions which project endwise outwardly from the flanges, such pin portions being sized to be snugly received within the hollow bat blade sections.

2. A harvester reel bat according to claim 1, wherein the tubular bat blade sections taper as they extend downwardly from their upper to their lower edges.

3. A harvester reel bat according to claim 2, wherein the bat blade sections are formed from formed panels of sheet metal having lower edge portions which come together and which are secured together along the lower edge of the bat blade sections.

4. A harvester reel bat according to claim 1, wherein the bat blade sections taper from their upper to their lower edges and the pin portions of the journal sections also taper as they extend downwardly from their upper towards their lower edges.

5. A harvester reel bat blade having a relatively wide upper edge portion, and decreasing in thickness from its upper edge down to its lower edge portion, and terminating in a relatively thin lower edge portion which leads the bat blade into the crop being harvested; at least one pick-up tine having an upper mounting portion including a mounting channel snugly embracing a lower portion of the bat blade; and means for securing a wall of such channel to said bat blade comprising an inwardly directed button on a side wall of the mounting channel and a receiving opening in a side wall of the bat blade.

6. A harvester reel bat according to claim 5, wherein each wall forming the mounting channel is of sufficient length longitudinally at the bat blade section, so that a single fastener point may exist between a wall and a side wall portion of the bat blade section and the tight fit of the bat blade section into the mounting channel will prevent sideways pivotal movement of the tine during harvesting.

* * * * *